S. F. CONNOLLY & V. OSBORNE.
PLANIMETER.
APPLICATION FILED APR. 24, 1908.

917,547.

Patented Apr. 6, 1909.
2 SHEETS—SHEET 1.

Witnesses:

Inventors
Samuel F. Connolly
Vivian Osborne
By James L. Norris
Atty.

S. F. CONNOLLY & V. OSBORNE.
PLANIMETER.
APPLICATION FILED APR. 24, 1908.

917,547.

Patented Apr. 6, 1909.
2 SHEETS—SHEET 2.

Witnesses:

Inventors
Samuel F. Connolly
Vivian Osborne
by James L. Norris
Atty.

UNITED STATES PATENT OFFICE.

SAMUEL FREDERICK CONNOLLY AND VIVIAN OSBORNE, OF LONDON, ENGLAND.

PLANIMETER.

No. 917,547.  Specification of Letters Patent.  Patented April 6, 1909.

Application filed April 24, 1908. Serial No. 429,100.

*To all whom it may concern:*

Be it known that we, SAMUEL FREDERICK CONNOLLY and VIVIAN OSBORNE, subjects of the King of Great Britain, residing at London, England, have invented certain new and useful Improvements in Planimeters, of which the following is a specification.

The object of our invention is certain improvements connected with apparatus such as planimeters and areameters of the kind referred to in Patent No. 812674 13th February 1906, for measuring and indicating the superficial area of hides, skins, and other surfaces, whereby the necessity of lifting such apparatus by hand is done away with, a lifting device and appliances being provided for the purpose, thus enabling the measuring of a quantity of leather or other surfaces to be effected with much greater speed than can be done with planimeters and areameters which are not provided with our lifting device and counterweight or balancing appliances.

Figure 1:
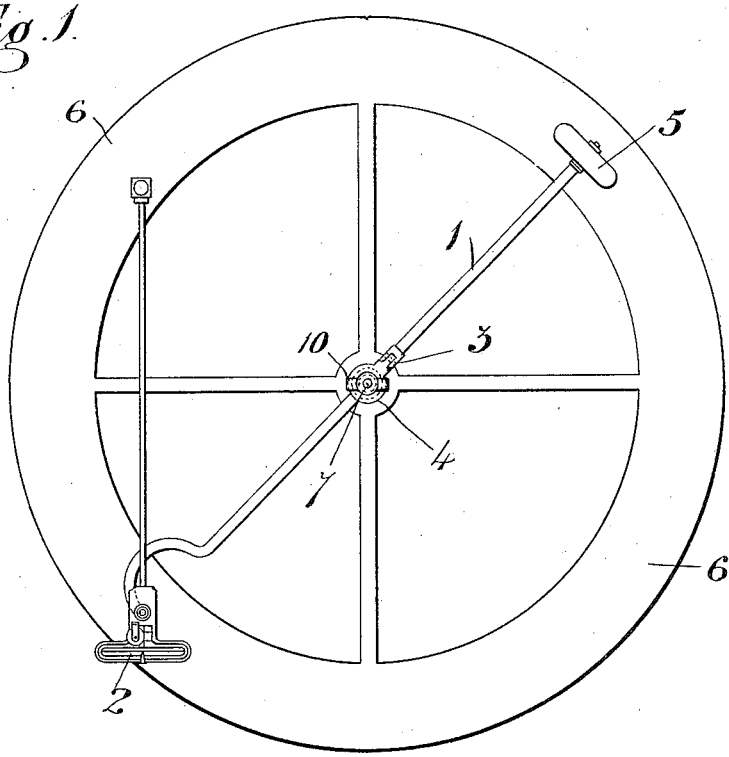
Figure 2:
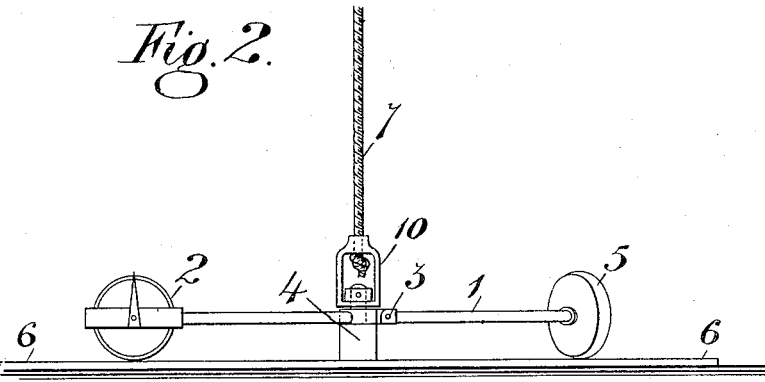
Figure 3:
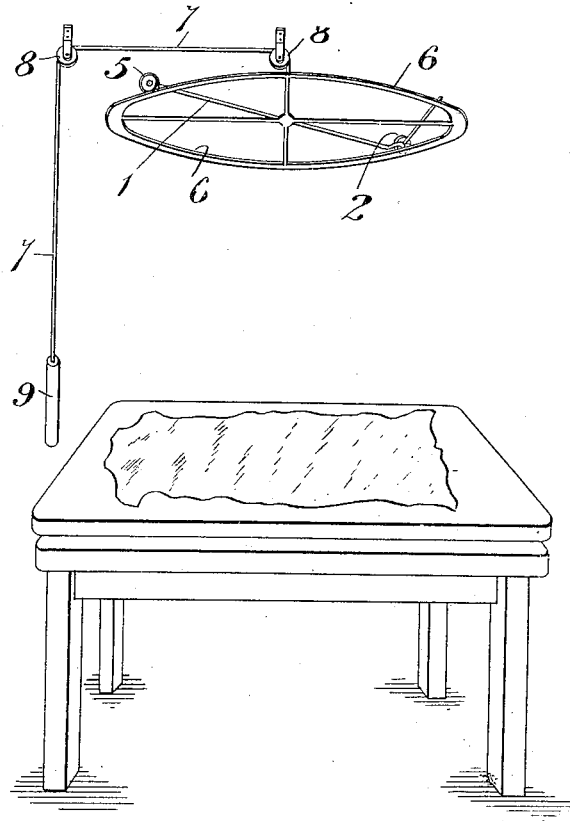

In the annexed drawings illustrating our invention, Figure 1 is a plan, and Fig. 2 an elevation showing a planimeter or measuring appliance or apparatus fitted with a counterbalance arm and mechanism for raising and suspending the whole apparatus in the manner shown in Fig. 3.

For the purpose of illustration or to demonstrate a practical application of the invention a track ring is shown in the accompanying drawing for the traveling wheel forming a part of the planimeter, but this track ring is a secondary feature of the invention.

For the purpose of our present invention, we fit an additional horizontal arm 1 to the planimeter or areameter 2, said arm 1 being hinge jointed as at 3, at one end to the fixed center of motion 4, its other or outer end carrying a weight or a weighted roller 5, which runs over the track 6. This additional arm 1 and weight or weighted roller 5 acts as a balance or counterpoise for the planimeter appliances 2, so that by connecting the center of the whole apparatus to a cord 7, wire, or chain running over an overhead pulley or pulleys 8, the complete machine and its disk or track 6 can be readily raised supported or suspended, and lowered between each operation.

The pulleys employed may be of the clutch or self holding type, or of the ordinary kind, in which case a counterweight 9 would be necessary.

The connection of the cord 7 to the machine is by swivel 10 or ball and socket or similar joint to allow for any side movement and of free rotation without twisting the cord 7.

What we do claim and desire to secure by Letters Patent is:—

1. In a measuring instrument of the class specified the combination with a planimeter, having a fixed center means, of an arm hinged at one end to the fixed center means, a weighted means at the other end of said arm, a joint device connected to the instrument at the center means, a suspending means connected to the joint device for supporting, raising and lowering the instrument pulleys engaged by the suspending means, and a weight attached to the suspending means.

2. An instrument of the class specified, the combination with a planimeter having a fixed center means, of a counterpoise appliance movably connected to the fixed center means and provided with a weight at its free extremity, and a weighted cord and pulley mechanism for raising, lowering, supporting, or suspending the mechanism.

In testimony whereof we have hereunto set our hands in the presence of two subscribing witnesses.

SAMUEL FREDERICK CONNOLLY.
VIVIAN OSBORNE.

Witnesses:
JOHN E. BURGE,
ERNEST C. H. MORRIS.